July 26, 1955  C. W. CASSELLS  2,713,728
SEALING MEANS FOR ROTARY DRYERS OR COOLERS
Filed Dec. 7, 1953  2 Sheets-Sheet 1
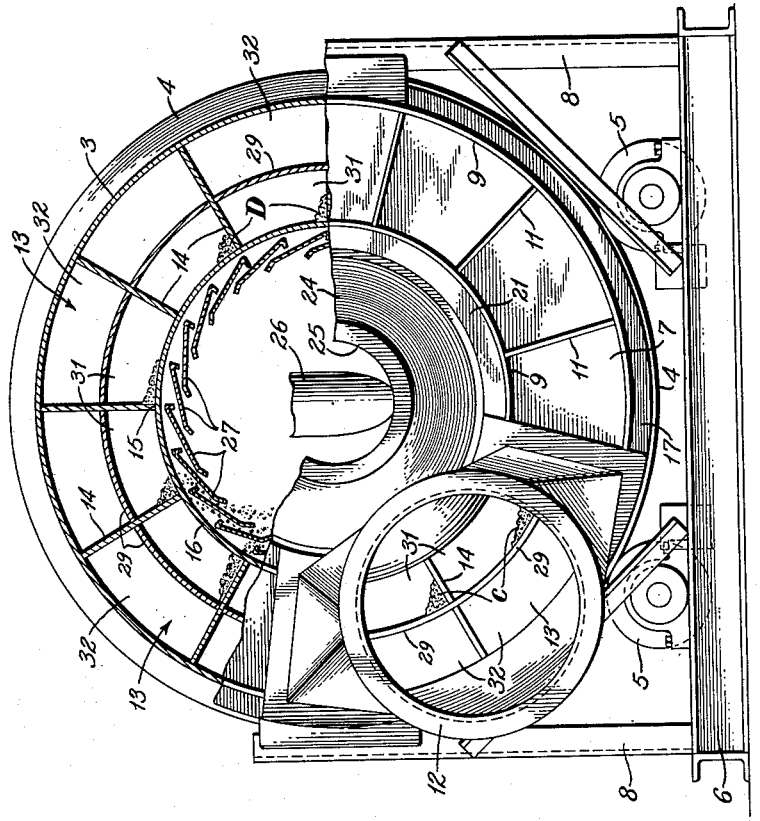
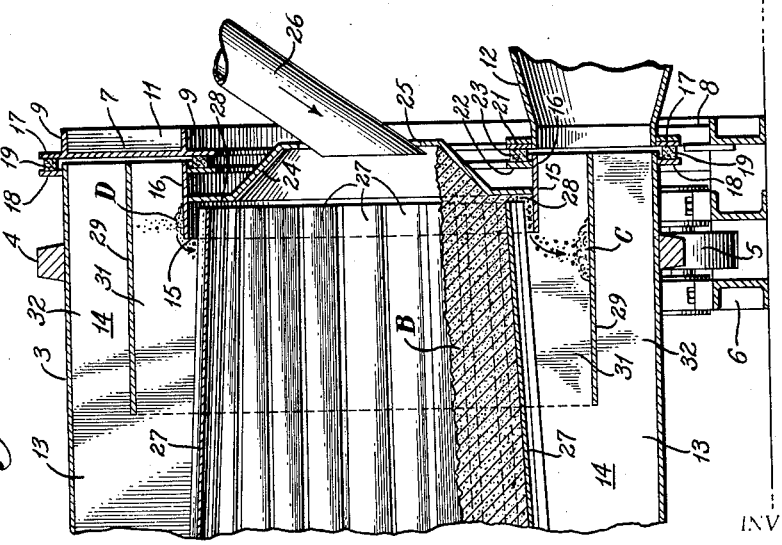
INVENTOR
Clarence W. Cassells
BY
ATTORNEY July 26, 1955    C. W. CASSELLS    2,713,728
SEALING MEANS FOR ROTARY DRYERS OR COOLERS
Filed Dec. 7, 1953    2 Sheets-Sheet 2
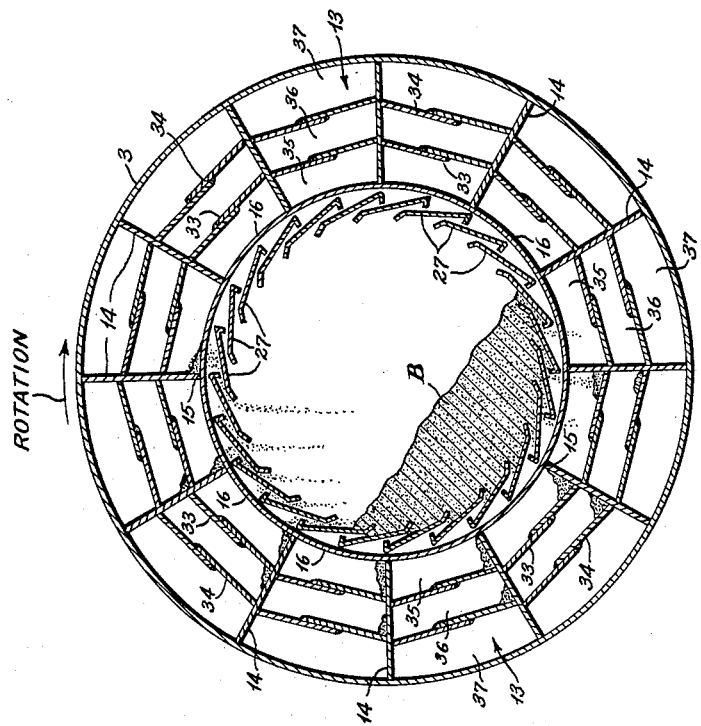
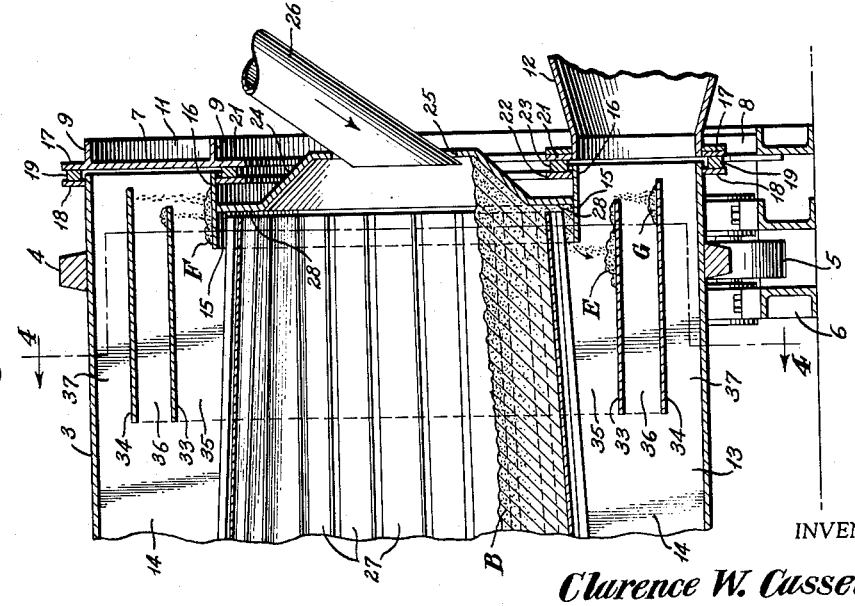
INVENTOR
Clarence W. Cassells
BY
ATTORNEY United States Patent Office 2,713,728
Patented July 26, 1955

2,713,728
SEALING MEANS FOR ROTARY DRYERS OR COOLERS

Clarence W. Cassells, Chicago, Ill., assignor to Link-Belt Company, a corporation of Illinois Application December 7, 1953, Serial No. 396,500

8 Claims. (Cl. 34—135)

This invention relates to new and useful improvements in seals for rotary dryers or coolers, and deals more particularly with means for preventing the granular, and usually abrasive, materials being processed from contacting such seals.

This application is a continuation-in-part of my copending application, Serial No. 325,180, filed December 10, 1952, for Sealing Means for Rotary Dryers or Coolers, now abandoned.

The efficient operation of a dryer or cooler employing treatment fluid which is passed in heat exchange relationship with the materials being treated requires the use of seals to prevent the escape of the fluid with the resulting loss in efficiency. Such seals are normally positioned between the stationary heads and the rotary cylinder in which the drying or cooling operation takes place, as illustrated in the John L. Erisman patent, No. 2,517,470, issued August 1, 1950. It will be readily apparent that seals of this type are subjected to severe operating conditions and they will be quickly damaged or destroyed if gritty or abrasive materials are permitted to come in contact with their frictionally engaged surfaces.

It is the primary object of this invention to provide seal protecting means for rotary dryers or coolers which will prevent the material being treated from coming in contact with the seal, and which will not interfere in any way with the introduction of the treatment fluid to the dryer or cooler.

A further object of the invention is to provide seal protecting means for rotary dryers or coolers which will trap and return to the bed of material being treated any amount of the latter that may spill from the treatment chamber and start to work toward the vicinity of the seals.

Another important object of the invention is to provide a circumferentially alined series of seal protecting baffles for rotary dryers or coolers which will trap and return to the treatment chamber any material which spills from the chamber in the vicinity of the seals.

Still another object of the invention is to provide two radially spaced, circumferentially alined series of seal protecting baffles that are mounted in rotary dryers or coolers to trap and return to the treatment chamber any material which spills from the chamber in the vicinity of the seals.

A further object of the invention is to provide a seal protecting baffle for rotary dryers or coolers which is formed of overlapping parts to permit limited variations in the width of the baffle so that the latter can be easily mounted in a position to trap and return to the treatment chamber any material which spills from the chamber in the vicinity of the seals.

Other objects and advantages of the invention will be apparent during the course of the following description.

In the accompanying drawings forming a part of this specification, and in which like reference characters are employed to designate like parts throughout the same, Figure 1 is a fragmentary, longitudinal sectional view of the feed end portion of a rotary cylinder type of dryer or cooler with the seal protecting means embodying this invention incorporated therein, Figure 2 is an end elevational view, partly broken away, of the structure illustrated in Fig. 1, Figure 3 is a fragmentary, longitudinal sectional view of the feed end portion of a rotary cylinder type of dryer or cooler with a modification of the seal protecting means embodying the invention incorporated therein, and Figure 4 is a transverse sectional view taken on line 4—4 of Fig. 3.

In the drawings, wherein for the purpose of illustration are shown the preferred embodiments of this invention, and first particularly referring to Figs. 1 and 2, reference character 3 designates the rotary cylinder of a dryer or cooler of the general type disclosed in the patent to Gustav Bojner et al., No. 1,709,456, issued April 16, 1929. The cylinder 3 is horizontally arranged and is supported for rotary movement by a suitable number of peripheral rings or tracks 4 that ride on rollers 5 which are suitably journaled in the supporting frame or base 6.

At the feed end of the dryer or cooler, a stationary distributor head 7 is supported by frame members 8 in a position adjacent the end of the cylinder 3. The distributor head 7 is provided with stiffening flanges 9 and a plurality of webs 11 which extend between and connect the flanges. Formed in one of the lower quadrants of the distributor head 7 is an inlet manifold 12 through which the hot or cold treatment fluid is delivered to one selected portion or zone of the interior of the cylinder 3 at a point adjacent its inner circumference.

The cylinder 3 has formed therein an annular series of longitudinal passages adjacent its inner circumference. These passages, which bear the reference character 13, are formed by longitudinally extending, radial louvres 14 that are secured along their outer longitudinal edges to the inner surface of the cylinder in any suitable manner. As illustrated in Fig. 1, the radial louvres 14 are gradually reduced in depth lengthwise of the cylinder 3 with the result that the space defined collectively by the inner longitudinal edges of the louvres gradually increases in diameter from the feed end to the discharge end of the cylinder.

At the feed end of the cylinder 3, the louvres 14 are provided with notches 15 which are arranged in circumferential alinement for receiving the annular ring 16. The outer edge of the ring 16 is in radial alinement with the corresponding edge of the cylinder 3 and the two alined edges collectively define the inlet openings for the annular series of passages 13. The distributor head 7, therefore, is arranged to cover the inlet openings of the passages 13 with the inlet manifold 12 in communication with only those passages that are successively rotated into longitudinal alinement therewith.

Sealing is provided between the distributor head 7 and the end edge of the cylinder 3 by the circumferentially extending radial flanges 17 and 18 on the distributor head 7 and cylinder 3, respectively, and by the seal member 19 which is carried by one of the radial flanges in frictional engagement with the other of the flanges. Sealing between the distributor head 7 and the outer edge of the annular ring 16 is provided by a similar seal structure consisting of the radial flanges 21 and 22 mounted on the distributor head and ring, respectively, and the seal member 23 which is carried by one of the flanges in frictional engagement with the other. It is to be understood that the seal structures that are illustrated and described herein are only representative, and that seals of the type covered by the John L. Erisman patent, No. 2,517,470, issued August 1, 1950, will be employed in commercial installations of the invention.

An end plate 24, having a central opening 25 through which the material to be treated is delivered to the treatment chamber of the dryer or cooler, is mounted in and extends across the bore of the annular ring 16. It will be noted that the inner portion of the ring 16 extends axially inwardly of the periphery of the end plate 24 for a purpose which will be later described. The material to be treated in the dryer or cooler is introduced through the opening 25 in the end plate 24 by means of a chute 26, or the like, and the opening 25 in the end plate is offset relative to the periphery of the plate so that the chute may pass through the opening at a sufficient angle to induce gravitational flow of the material into the dryer or cooler.

Mounted on the inner free edge portions of the radial louvres 14 in any suitable manner, such as that disclosed in the patent to John L. Erisman, No. 2,522,025, issued September 12, 1950, are a plurality of circumferentially spaced, tangential louvres 27 which form a perforate material supporting shell. The treatment fluid will pass between the tangential louvres into the material bed B from those passages 13 that are alined with the inlet manifold 12. The ends of the louvres 27 at the feed end of the cylinder 3 are spaced from the end plate 24 to permit expansion and contraction of the louvres. This spacing unavoidably results in the formation of an annular opening 28 through which materials from the bed B may spill. That portion of the annular ring 16 which extends axially inwardly of the periphery of the end plate 24, however, lies in surrounding relationship with the opening 28 and forms a baffle for deflecting the spilled material longitudinally away from the feed end of the cylinder 3.

Arranged in circumferential alinement between adjacent radial louvres 14 are a plurality of baffle plates 29 which extend axially inwardly from the plane defined by the outer edges of the cylinder 3 and the annular baffle ring 16 to a point beyond the inner edge of the ring 16. These baffle plates 29, therefore, divide the inlet end portions of the passages 13 into inner and outer ducts 31 and 32, respectively. The radial spacing and slope of the baffle plates 29 relative to the annular ring 16 and the cylinder 3 may be varied to change the relative radial dimensions and relationship of the ducts 31 and 32 but they generally will be arranged as illustrated.

The operation of the annular ring 16 and the baffle plates 29 to protect the seal members 19 and 23 from any of the material that may spill through the annular opening 28 now will be explained:

The material that is introduced through the chute 26 into the treatment chamber must pass over the annular opening 28 with the result that a relatively small portion of the same will spill radially downwardly through the opening 28. The downward movement of the material from the opening 28 is interrupted by the inner portion of the annular ring 16. If an excessive amount of the spilled material accumulates on the inner surface of the ring 16 it will flow over the edge of the ring and fall through the inner ducts 31 onto the baffle plates 29, as indicated at C in Fig. 1. The material that does not overflow the inner edge of the ring 16, of course, will be carried around and will spill back into the treatment chamber through the upper part of the opening 28. The excess material C that overflows the ring 16 will accumulate on the baffle plates 29 generally inwardly of the inner edge of the ring 16. This material is thereafter carried around by rotation of the cylinder 3 to the top of the dryer from which point it will fall radially inwardly toward the outside of the perforate shell formed by the louvres 27. Most of this material will pass between the louvres and be returned to the bed B which is supported on the inner side of the louvres 27 in the lower portion of the dryer.

However, a small amount of the material falling from the baffle plates 29 at the upper portion of the dryer may collect at D, see Fig. 1, on the outer surface of the ring 16 and be returned by the rotation of the cylinder 3 to the lower part of the latter where it will become a part of the spilled material C.

It will be noted that no portion of the material from the bed B is ever permitted to enter the outer ducts 32 at the inlet ends of the passage 13 and that the seal member 19, therefore, will never be subjected to the abrasive action of the material.

Referring now to Figs. 3 and 4 for a detail description of the modification of the invention illustrated therein, it will be noted that the structure and arrangement of the elements illustrated in these figures are identical to those illustrated in Figs. 1 and 2 with the single exception of the radially spaced inner and outer baffles 33 and 34, respectively, at the inlet ends of the passages 13. Therefore, the structure illustrated in Figs. 3 and 4 which is identical to that of Figs. 1 and 2 has been designated by the same reference characters and will not again be described.

The inner baffles 33 are arranged in circumferential alinement between adjacent radial louvres 14 and are spaced at approximately one-third the radial dimension of the passageway 13 outwardly of the ring 16. The outer baffles 34 are similarly arranged in circumferential alinement between adjacent radial louvres 14 and are spaced at approximately two-thirds the radial dimension of the passageway 13 outwardly of the ring 16. Each one of the baffles 33 and 34 is formed of a pair of substantially flat baffle plates having their outer longitudinal edge portions suitably connected to the radial louvres 14 and their opposite edge portions overlapped and suitably connected to each other. This construction of the baffles 33 and 34 permits adjustment of the width of the baffles when the plates are connected to the radial louvres 14 and subsequently connected to each other to compensate for minor irregularities in the circumferential spacing of the radial louvres.

The ends of the baffles 33 and 34 adjacent the distributor head 7 are radially stepped with the ends of the inner baffles 33 being spaced at a slightly greater distance from the distributor head than the corresponding ends of the baffles 34. The opposite ends of the baffles 33 and 34 extend axially inwardly to a point beyond the inner edge of the ring 16. The baffles 33 and 34, therefore, divide the inlet end portions of the passages 13 into inner, middle and outer ducts 35, 36 and 37, respectively. The radial spacing and slope of the baffles 33 and 34 relative to the ring 16 and the cylinder 3 may be varied to change the relative radial dimensions and relationship of the ducts 35, 36 and 37 but they generally will be arranged as illustrated.

The operation of the annular ring 16 and the baffles 33 and 34 to protect the seal members 19 and 23 from any material that may spill through the annular opening 28 will now be described:

A small amount of the material introduced into the treatment chamber will spill radially downwardly through the opening 28 onto the inner portion of the ring 16 as described in connection with Fig. 1 above. If an excessive amount of the spilled material accumulates on the inner surface of the ring 16 it will flow over the edge of the ring and will fall through the inner ducts 35 onto the baffles 33 as indicated at E in Fig. 3. The material that does not overflow the inner edge of the ring 16, however, will be carried around by the rotation of the cylinder 3 and will spill back into the treatment chamber through the upper part of the opening 28 and the adjacent portions of the spaces between the louvres 27. The material E that overflows the inner edge of the ring 16 will accumulate on the baffles 33 generally inwardly of the inner edge of the ring and will be carried by rotation of the cylinder to the top of the dryer from which point it will fall radially inwardly toward the outside of the shell formed by the louvres 27 and will pass between the louvres for return to the bed B in the treatment chamber of the dryer.

A small amount of material E falling from the baffles 33 at the upper portion of the dryer may collect at F, see Fig. 3, on the outer surface of the ring 16 and be returned by rotation of the cylinder to the lower part of the latter where it will become a part of the spilled material E. It will be noted that the material falling across the ducts 35 will be carried generally away from the inlet ends of the passages 13 by the introduction of treatment fluid through the inlet manifold 12. A small amount of the material E, however, may work rearwardly toward the distributor head 7 as it is carried by rotation of the cylinder 3. If, however, any of this material falls over the edge of the baffles 33 adjacent the distributor head 7 it will fall across the duct 36 and will accumulate on the baffles 34 as indicated at G in Fig. 3. The material G will thereafter be carried around by rotation of the cylinder 3 to the top of the dryer at which point it will fall radially inwardly and become a part of the material F or will fall onto the outer surfaces of the baffles 33. In either event, the material G will be returned by rotation of the cylinder 3 to the lower part of the latter where it will be moved longitudinally away from the inlet manifold 12 by the treatment fluid to subsequently be returned to the upper part of the dryer where it will fall radially inwardly between the louvres 27 to the bed of material B in the treatment chamber of the dryer.

It will be noted that no portion of the material from the bed B is ever permitted to enter the outer ducts 37 at the inlet end of the passage and that the seal member 19, therefore, will never be subjected to the abrasive action of the material.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. A dryer or cooler comprising a rotatable cylinder, a plurality of radial louvres extending longitudinally of and spaced circumferentially around the inner surface of said cylinder to provide an annular series of radially inwardly opening treatment fluid passages, an end plate connected to the inner edges of said radial louvres adjacent one end of said cylinder and having a central opening for admitting the material to be treated into the interior of said cylinder, a stationary annular distributor head for closing the ends of said treatment fluid passages adjacent said end plate and having an inlet manifold formed in one portion thereof for admitting treatment fluid to the passages as they are rotated into longitudinal alinement therewith, sealing means between the stationary head and the adjacent end of said rotatable cylinder and between said head and the outer periphery of said end plate, a perforate material bed supporting shell mounted on the inner edges of said louvres and extending into spaced relationship with said end plate leaving an annular opening through which a portion of the material admitted to said shell through said end plate may spill into said treatment fluid passages, and baffle means circumferentially spanning each of said passages radially outwardly of said annular opening to collect the material that is spilled through said opening and carry it to the upper portion of the cylinder, during rotation of the latter, for return to the material bed through the perforate shell so that the spilled material will not contact said sealing means.

2. A dryer or cooler comprising a rotatable cylinder, a plurality of radial louvres extending longitudinally of and spaced circumferentially around the inner surface of said cylinder to provide an annular series of radially inwardly opening treatment fluid passages, an end plate connected to the inner edges of said radial louvres adjacent one end of said cylinder and having a central opening for admitting the material to be treated into the interior of said cylinder, a stationary annular distributor head for closing the ends of said treatment fluid passages adjacent said end plate and having an inlet manifold formed in one portion thereof for admitting treatment fluid to the passages as they are rotated into longitudinal alinement therewith, sealing means between said stationary head and the adjacent end of said rotatable cylinder and between said head and the outer periphery of said end plate, a perforate material bed supporting shell mounted on the inner edges of said louvres and extending into spaced relationship with said end plate leaving an annular opening through which a portion of the material admitted to said shell through said end plate may spill into said treatment fluid passages, and a baffle extending axially inwardly from the periphery of said end plate and circumferentially spanning each of said passages radially of said annular opening to collect the material that is spilled through said opening and carry it to the upper portion of the cylinder, during rotation of the latter, for return to the material bed through the perforate shell so that the spilled material will not contact said sealing means.

3. A dryer or cooler comprising a rotatable cylinder, a plurality of radial louvres extending longitudinally of and spaced circumferentially around the inner surface of said cylinder to provide an annular series of radially inwardly opening treatment fluid passages, an end plate connected to the inner edges of said radial louvres adjacent one end of said cylinder and having a central opening for admitting the material to be treated into the interior of said cylinder, a stationary annular distributor head for closing the ends of said treatment fluid passages adjacent said end plate and having an inlet manifold formed in one portion thereof for admitting treatment fluid to the passages as they are rotated into longitudinal alinement therewith, sealing means between said stationary head and the adjacent end of said rotatable cylinder and between said head and the outer periphery of said end plate, a perforate material bed supporting shell mounted on the inner edges of said louvres and extending into spaced relationship with said end plate leaving an annular opening through which a portion of the material admitted to said shell through said end plate may spill into said treatment fluid passages, and a baffle circumferentially spanning the end portion of each of said passages adjacent said distributor head in radially outwardly spaced relationship with said annular opening to collect the material that is spilled through said opening and carry it to the upper portion of the cylinder, during rotation of the latter, for return to the material bed through the perforate shell so that the spilled material will not contact said sealing means.

4. A dryer or cooler comprising a rotatable cylinder, a plurality of radial louvres extending longitudinally of and spaced circumferentially around the inner surface of said cylinder to provide an annular series of radially inwardly opening treatment fluid passages, an end plate connected to the inner edges of said radial louvres adjacent one end of said cylinder and having a central opening for admitting the material to be treated into the interior of said cylinder, a stationary annular distributor head for closing the ends of said treatment fluid passages adjacent said end plate and having an inlet manifold formed in one portion thereof for admitting treatment fluid to the passages as they are rotated into longitudinal alinement therewith, sealing means between said stationary head and the adjacent end of said rotatable cylinder and between said head and the outer periphery of said end plate, a perforate material bed supporting shell mounted on the inner edges of said louvres and extending into spaced relationship with said end plate leaving an annular opening through which a portion of the material admitted to said shell through said end plate may spill into said treatment fluid passages, a first baffle extending axially inwardly from the periphery of said end plate and circumferentially spanning each of said passages radially of said annular opening to deflect the material that is spilled through said opening longitudinally away from said sealing means, and a baffle circumferentially spanning the end portion of each of said passages adjacent said distributor head in radially outwardly spaced relationship with said first baffle and extending axially inwardly from the inner edge of the first baffle to collect the material that is spilled over said edge and carry it to the upper portion of the cylinder, during rotation of the latter, for return to the material bed through the perforate shell so that the spilled material will not contact said sealing means.

5. A dryer or cooler comprising a rotatable cylinder, a plurality of radial louvres extending longitudinally of and spaced circumferentially around the inner surface of said cylinder to provide an annular series of radially inwardly opening treatment fluid passages, an end plate connected to the inner edges of said radial louvres adjacent one end of said cylinder and having a central opening for admitting the material to be treated into the interior of said cylinder, a stationary annular distributor head for closing the ends of said treatment fluid passages adjacent said end plate and having an inlet manifold formed in one portion thereof for admitting treatment fluid to the passages as they are rotated into longitudinal alinement therewith, sealing means between said stationary head and adjacent end of said rotatable cylinder and between said head and the outer periphery of said end plate, a perforate material bed supporting shell mounted on the inner edges of said louvres and extending into spaced relationship with said end plate leaving an annular opening through which a portion of the material admitted to said shell through said end plate may spill into said treatment fluid passages, an annular ring extending axially inwardly from the periphery of said end plate in surrounding relationship with said annular opening to deflect material that is spilled through said opening longitudinally away from said sealing means, and a plurality of baffle plates connected between the medial portions of adjacent radial louvres at the end portions of said passages adjacent said distributor head to divide said end portions into inner and outer ducts, said inner duct receiving the material that is spilled from the inner edge of said ring so that rotation of said ducts into their uppermost positions will cause said material to drop onto and through said perforate shell for return to the interior of the shell.

6. A dryer or cooler comprising a rotatable cylinder, a plurality of radial louvres extending longitudinally of and spaced circumferentially around the inner surface of said cylinder to provide an annular series of radially inwardly opening treatment fluid passages, an end plate connected to the inner edges of said radial louvres adjacent one end of said cylinder and having a central opening for admitting the material to be treated into the interior of said cylinder, a stationary annular distributor head for closing the ends of said treatment fluid passages adjacent said end plate and having an inlet manifold formed in one portion thereof for admitting treatment fluid to the passages as they are rotated into longitudinal alinement therewith, sealing means between said stationary head and the adjacent end of said rotatable cylinder and between said head and the outer periphery of said end plate, a perforate material bed supporting shell mounted on the inner edges of said louvres and extending into spaced relationship with said end plate leaving an annular opening through which a portion of the material admitted to said shell through said end plate may spill into said treatment fluid passages, and a pair of radially spaced baffles circumferentially spanning the end portion of each of said passages adjacent said distributor head radially outwardly of said annular opening to collect the material that is spilled through said opening and carry it to the upper portion of the cylinder, during rotation of the latter, for return to the material bed through the perforate shell so that the spilled material will not contact said sealing means.

7. A dryer or cooler comprising a rotatable cylinder, a plurality of radial louvres extending longitudinally of and spaced circumferentially around the inner surface of said cylinder to provide an annular series of radially inwardly opening treatment fluid passages, an end plate connected to the inner edges of said radial louvres adjacent one end of said cylinder and having a central opening for admitting the material to be treated into the interior of said cylinder, a stationary annular distributor head for closing the ends of said treatment fluid passages adjacent said end plate and having an inlet manifold formed in one portion thereof for admitting treatment fluid to the passages as they are rotated into longitudinal alinement therewith, sealing means between said stationary head and the adjacent end of said rotatable cylinder and between said head and the outer periphery of said end plate, a perforate material bed supporting shell mounted on the inner edges of said louvres and extending into spaced relationship with said end plate leaving an annular opening through which a portion of the material admitted to said shell through said end plate may spill into said treatment fluid passages, and a pair of radially spaced baffles circumferentially spanning the end portion of each of said passages adjacent said distributor head, the ends of said baffles adjacent said distributor head being longitudinally stepped with the ends of the radially inner baffles being at a greater distance from the distributor head than the corresponding ends of the radially outer baffles, said inner and outer baffles being mounted radially outwardly of said annular opening to collect the material that is spilled through said opening and from the stepped ends of said inner baffles, respectively, and carry it to the upper portion of the cylinder, during rotation of the latter, for return to the material bed through the perforate shell so that the material will not contact said sealing means.

8. A dryer or cooler comprising a rotatable cylinder, a plurality of radial louvres extending longitudinally of and spaced circumferentially around the inner surface of said cylinder to provide an annular series of radially inwardly opening treatment fluid passages, an end plate connected to the inner edges of said radial louvres adjacent one end of said cylinder and having a central opening for admitting the material to be treated into the interior of said cylinder, a stationary annular distributor head for closing the ends of said treatment fluid passages adjacent said end plate and having an inlet manifold formed in one portion thereof for admitting treatment fluid to the passages as they are rotated into longitudinal alinement therewith, sealing means between said stationary head and the adjacent end of said rotatable cylinder and between said head and the outer periphery of said end plate, a perforate material bed supporting shell mounted on the inner edges of said louvres and extending into spaced relationship with said end plate leaving an annular opening through which a portion of the material admitted to said shell through said end plate may spill into said treatment fluid passages, and a pair of radially spaced baffles laterally spanning the end portions of each of said passages adjacent said distributor head, each of said baffles being formed of a pair of baffle plates having their outer longitudinal edges connected to adjacent ones of said radial louvres and their inner longitudinal edge portions overlapped and connected to each other, each of said pairs of baffles being mounted radially outwardly of said annular opening to collect the material that is spilled through said opening and carry it to the upper portion of the cylinder, during rotation of the latter, for return to the material bed through the perforate shell so that the spilled material will not contact said sealing means.

References Cited in the file of this patent

UNITED STATES PATENTS

| 2,483,630 | Erisman | Oct. 4, 1949 |
| 2,517,470 | Erisman | Aug. 1, 1950 |
| 2,522,025 | Erisman | Sept. 12, 1950 |

FOREIGN PATENTS

| 555,136 | Germany | July 18, 1932 |
| 563,293 | Great Britain | Aug. 8, 1944 |